United States Patent Office 2,734,628
Patented Feb. 14, 1956

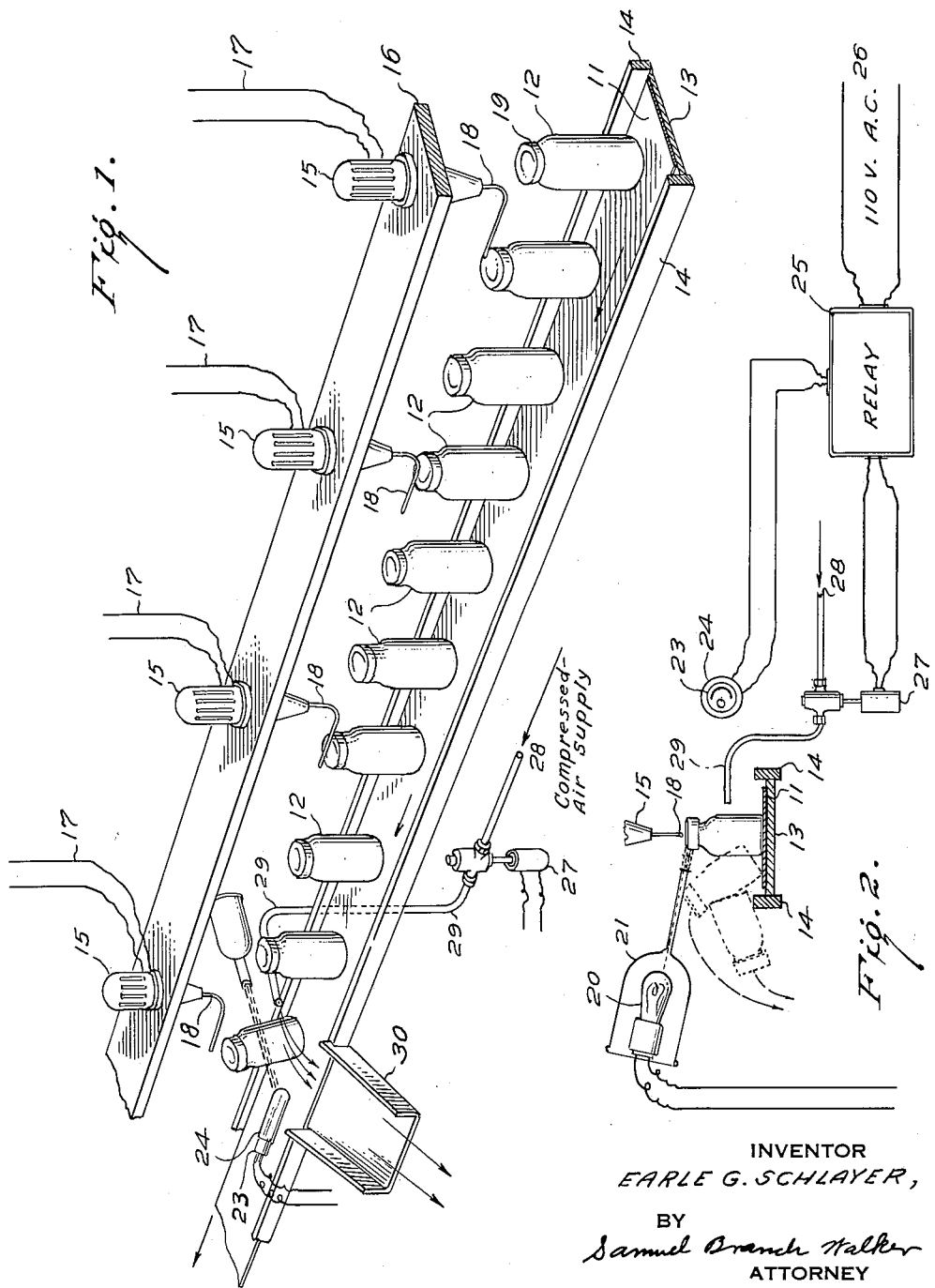

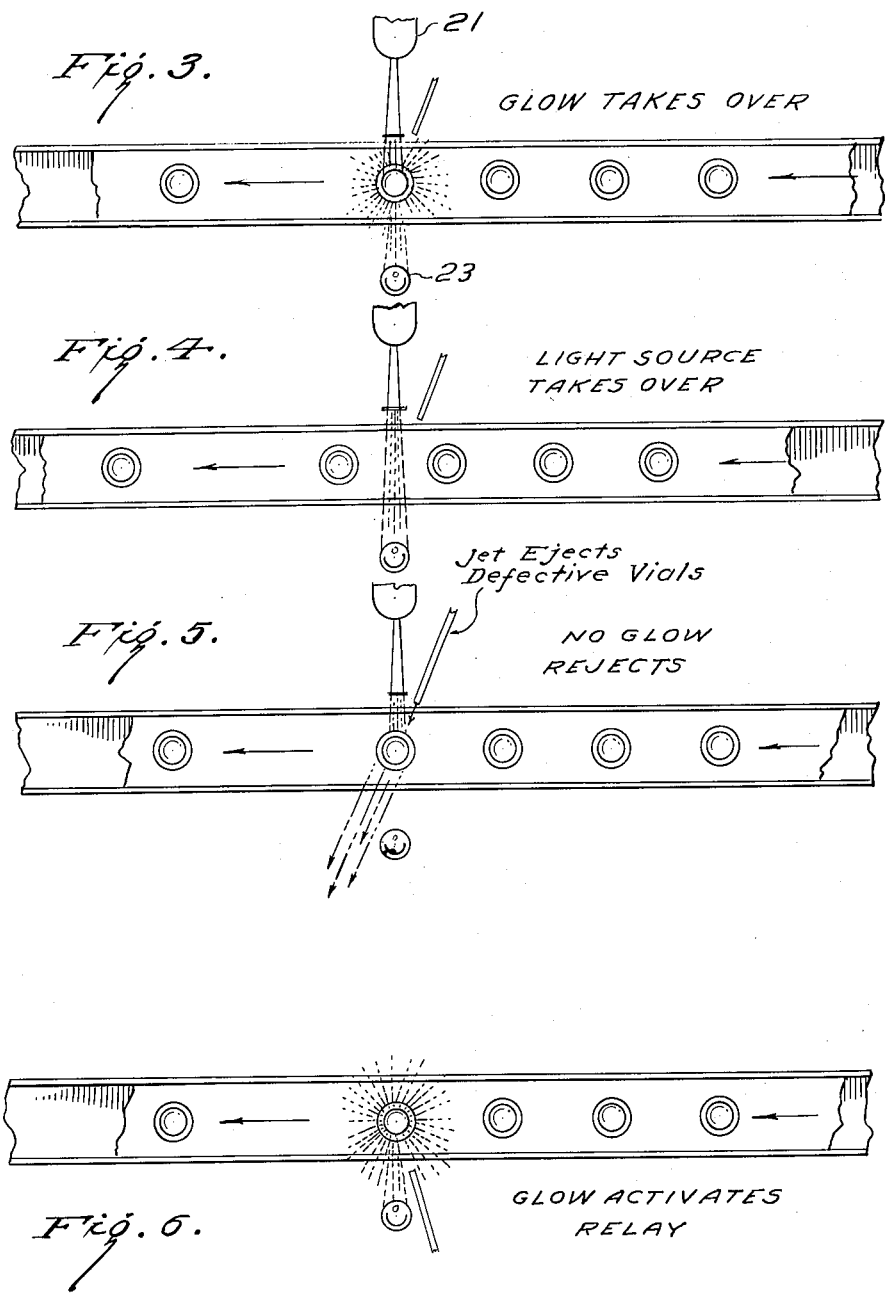

2,734,628

TESTING VACUUM IN VIALS

Earle G. Schlayer, Suffern, N. Y., assignor to American Cyanamid Company, New York, N. Y., a corporation of Maine Application October 20, 1952, Serial No. 315,780

5 Claims. (Cl. 209—111)

The present invention relates to a method and apparatus for the testing of the vacuum in evacuated vials. I have found that if vials, particularly of the type adapted to contain pharmaceuticals, are evacuated sufficiently to assure stability of a frozen and dried product, a spark test may be made by using a high-voltage, high-frequency discharge to the aluminum seal on the top of the vial which thereby induces a glow discharge within the vial, which glow discharge may be detected by photoelectric means and defective vials separated automatically.

In the past, it has been difficult to determine if vials which were sealed under a vacuum would retain that vacuum. Solutions of colored dyes have been used to determine if the dyes were leaking, submerging the vials in a colored liquid to see if the liquid would leak into the vial. Other test means have been used, all rather unsatisfactorily.

The necessity for absolute certainty in checking the individual vial vacuum can be easily understood when it is considered that vials which contain biological products which are to be used for the prevention or alleviation of disease in man or animals, and under many circumstances, may lose their potency if the vacuum is broken so that the product can be inactivated and yet show no outward sign of the loss of potency. Up until its use and even thereafter, there would be no visual indication of its impotency, and yet, the person or animal which was supposed to have received a potent injection would have received an injection which had no value whatsoever, and cause a failure in treatment that could be both inexplicable and disastrous. If a vial containing a vaccine loses its potency because of the loss of vacuum, all animals inoculated with that vaccine would be thought to have received an immunity which they did not, in fact, possess, which could easily result in large economic losses. Worse, if a human were to receive an injection from a vial having a seal which leaked and thereby inactivated the product, the human would be thought to be immune to a disease to which he was susceptible, with consequent loss of life. Accordingly, the necessity for absolute certainty in testing the vacuum is far higher than that normally required in testing procedures.

By the use of my device, it is economically possible to automatically check the individual vacuum, either just after filling or after a reasonable storage period, or both, to thereby insure that each vial is air tight and contains its material under the desired vacuum, thereby insuring an inert, sterile, dry condition within the vial and the full potency of the material for its normal storage life.

I have found that, strangely, a single spark test on a vial is frequently inadequate to break down the resistance of the vial, but that if a plurality of tests are made the resistance is finally broken down, and thereafter, the vial glows freely with each spark discharge. Accordingly, in a preferred embodiment of my device, I use a plurality of sparking electrodes, the first of which are to break down the resistance, and the last spark is used in conjunction with a photoelectric cell to detect the proper glow and separate defective vials.

It has long been known that gases under reduced pressure would glow freely, and the type and quality of the glow would be a function of the pressure within the system. However, the use of a single electrode which operates through the aluminum seal of a vial and which in no way alters the product is a new and important contribution to the testing of pharmaceutical and biological-containing vials.

While modifications thereof may be easily made, a particular embodiment of my invention is shown in the accompanying drawings:

Figure 1 is a pictorial view of the apparatus in operation;

Figure 2 is a cross section showing how a defective vial is removed;

Figure 3 is a schematic drawing showing how at the particular operating position a discharge glow from the vial actuates the photoelectric cell;

Figure 4 is a slightly later view showing how a beam of light from an illuminating source actuates the photoelectric cell;

Figure 5 is a view showing how when an unsatisfactory vial passes, the beam of light from the source is interrupted by the vial, and yet no additional glow is given off by the vial;

Figure 6 is an alternative construction showing how the apparatus may be modified, so that the glowing vials are removed from the belt, thereby insuring that any failure in operation cannot result in a defective vial passing;

Figure 7:
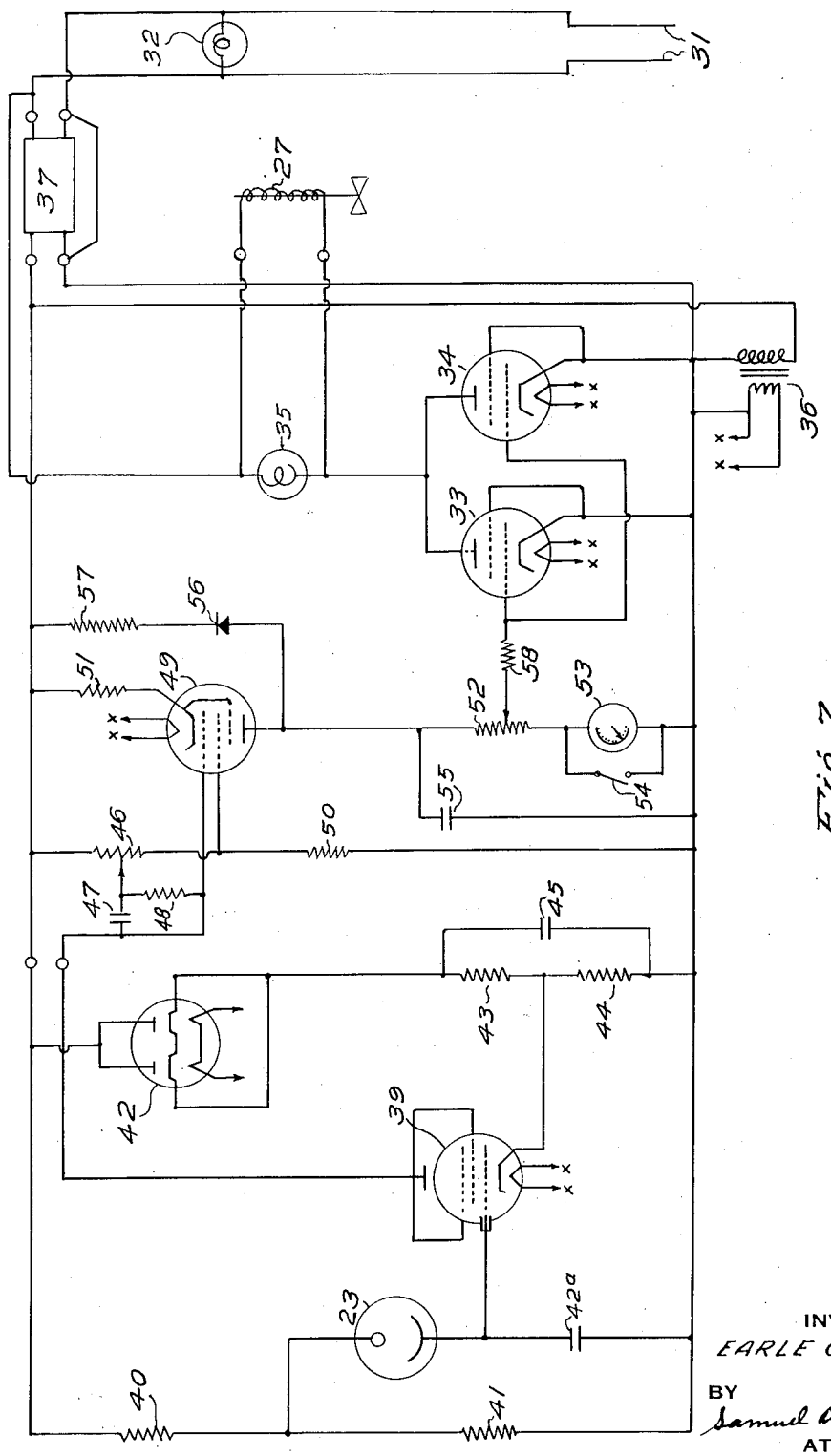
Figure 7 is a wiring diagram of a particular modification of the apparatus.

Fig. 1 shows a conveyor belt 11 on which the vials 12 to be tested are placed. The belt is supported by a belt support 13 which is conveniently of metal, and on each side of the conveyor are vial guards 14. Any suitable mechanism may be used to space the vials on the belt, and such spacing means are not part of the present invention.

The belt, with the vials spaced thereon, moves from right to left as shown in Fig. 1, and, as they move, the vials pass under a series of spark coils 15, supported in a coil support 16. Each of the coils has appropriate coil leads 17 to the coil. The coil is a standard high vacuum testing spark coil of the Tesla type which will deliver from about 9,000 to 17,000 volts or more at such a frequency that the spark cannot injure a person who receives the discharge. A lower frequency may have certain utility, but it is highly desirable that the frequency be high enough that, should an operator accidentally contact one of the coils, no harm will result. To the end of each of the coils is attached an electrode 18, which may be a piece of copper wire bent so that it is approximately parallel with the top of the vials as they pass along the belt, and spaced slightly therefrom. A minimum spacing is desired, merely being sufficient that the vials do not rub on the electrode.

Each of the vials has thereon a metal seal 19, which is normally a one, two or three piece seal designed to retain a rubber stopper in the vial. The metal shield is usually made of aluminum, but other ductile metals may be used. In the trade, they are usually known as aluminum seals. The aluminum seal acts as an electrode in conjunction with the spark coil electrode for the production of the glow discharge. As the vials pass along the belt and pass under the spark coil, each coil produces a spark of preferably in the range of 12,000 to 17,000 volts or more, at high frequency, and each vial is under each spark coil for an appreciable length of time as it traverses the length of the spark coil electrode. Commercial high voltage coils used for the testing of all glass apparatus with a single, pointed, exposed, high voltage electrode are suitable. Such coils have a wide frequency spectrum, as the distributed capacity of the coil gives a non-critical tuning effect. The discharge may be picked up by a radio receiver over a range of 100 kilocycles to 30 megacycles. The peak of the discharge energy may be about 3 megacycles. On many vials, there is a glow discharge which takes place as the vial passes under each of the electrodes. However, some vials appear to exert an unusually high resistance, so that a glow does not take place on the first or second discharge, but will occur on a later discharge. Usually, once the discharge has taken place, there appears to be a breakdown of resistance, so that a subsequent discharge more readily occurs. By using a plurality of spark coils, there is much greater certainty that, if the vacum in the vial is proper, a discharge will occur at not later than the third or fourth electrode, and, accordingly, by using four coils, it is possible to be reasonably certain that, if a vial does have a proper vacuum, a discharge will occur under the last of the electrodes.

The vials can be manually sorted at this point, but it would be an extremely tedious procedure, and, for this reason, I have perfected an automatic separator.

A suitably energized light bulb 20 has surrounding it a light shield 21, so placed that a narrow light ray 22 passes through the position which is occupied by a vial, as the vial passes along the belt, and shines on a photocell 23 which may be shielded by a cell shield 24. It is desirable that the beam of light be rather small and that the shield protect the photocell from light except from the light ray and the glow from the vial during the time of discharge. The whole device is normally placed in a darkened room or a darkened chamber, and by using blackened walls and shielding the photocell from stray light, inspection ports can be opened for the inspection of the machine while in operation without actuating the photocell inadvertently.

There is an electrode above the aluminum seal at the test point, and the discharge from the coil 15 causes a glow in the vial so that as the vial passes along, it interrupts the light ray 22, which, in turn, inactivates the photocell except that the glow discharge taking place in the vial actuates the photocell and thereby causes the photocell to remain in its light-indicating state. If a vial passes which does not have a satisfactory vacuum, no glow discharge takes place, and when the vial interrupts the beam of light from the bulb 20, the cell has no light shining upon it and causes a different response of the relay 25. The relay 25, diagrammatically shown, is connected to a power source 26, which may be 110 volt A. C., and controls a solenoid valve 27 which, in turn, controls the flow of air from a compressed air supply 28 to an air jet 29. The air jet is placed in such a position that when the solenoid valve is open, the air blows through the jet and knocks off the vial, causing it to fall in a reject chute 30 and, accordingly, be suitably disposed of as an unsatisfactory vial.

I prefer to use a normally open solenoid valve, so that the flow of air through the jet is the normal state of the valve and have the valve closed by being actuated from the photocell relay, so that if any part of the relay fails, then the valve opens and causes all vials to be rejected.

As a matter of operating convenience, it is frequently desirable to run all of the rejected vials through the device again to see if they are rejected at a second pass, as sometimes the additional spark discharges will break down the resistance and cause the vial to glow and sometimes other mechanical failures may have been responsible for certain entirely satisfactory vials being knocked into the reject group. Because of the peculiarly high standards required, the device is normally kept so adjusted, that should there be any question whatsoever as to the adequacy of the vacuum in the vial, the vial is discarded as unsatisfactory.

Fig. 3 shows diagrammatically the position of a vial cutting off the ray of light falling on the phototube and, thereby, interrupting its illumination. The glow which takes place at this point normally then acts to activate the photocell, so that the photocell is continuously actuated, and, as the vial passes beyond the point at which it interrupts the ray of light, the light source takes over and keeps the photocell actuated as shown in Fig. 4. In Fig. 5, there is shown the situation in which there is no glow because the vial is defective, and, at this point, the air jet being no longer interrupted, removes the vial from the belt.

Fig. 7 is illustrative of a particular type of relay which may be used for the present purposes. It is to be understood that many other types of photocell relays may be used, and such relays are well known in the art. The particular one shown has been found to be thoroughly reliable, easily adjusted, and to operate satisfactorily from an ordinary 110-volt, A. C. source without the necessity for the conversion to D. C. through a power supply system. The tubes act as combined rectifier and working tubes and by operating on only one half of the cycle in effect give an extremely reliable and yet simple form of relay. Basically, the unit utilizes a phototube 23 having a cathode and an anode, which is exposed to the light to be detected, a two-stage, direct coupled amplifier and a Thyratron solenoid valve circuit. Alternating current is fed directly to the plate of the amplifier tubes, and they operate only on the part of the cycle which causes a positive charge on the plate with respect to the cathode. In addition, a selenium rectifier may be provided to allow a reverse current to flow to shunt the indicating meter, in order to have the indicating meter show a change of a small amount in the plate current, rather than the total plate current.

In more detail, alternating current is applied to the power leads 31. A pilot light 32 indicates when the power supply is on. The Thyratron tubes 33 and 34 are connected with their plates and cathodes directly across the 110-volt A. C. source with the solenoid wired in series with the plate supply to the Thyratrons and in parallel with an indicating light 35, which indicates that the relay is in operation, the light being so connected that it is on when the solenoid is energized, and the solenoid is normally energized to keep the air valve closed. Parallel Thyratron tubes are used to insure that an adequate current supply is available and increase reliability. A filament transformer 36 is connected with the primary across the power line, and the secondary to the filaments of the tubes. The connections at XX are indicated to the various filaments in order to avoid unduly complicating the wiring diagram.

A voltage regulator 37 is provided to insure that the voltage supply to the filament circuits and to the phototube and amplifier tubes is regulated with a reasonable degree of accuracy in order that more reliable and certain operation can be maintained with a fluctuating power source.

A phototube 23 is connected with its cathode to the control grid of the first amplifier tube 39, a pair of resistances 40 and 41 are used as a voltage dividing network to supply a proper A. C. voltage to the anode of the phototube. A CE7 phototube and a 6J7 first amplifier tube have been found to be very satisfactory. A condenser 42a is connected between the cathode of the phototube and the other side of the A. C. line, so that the phototube acts both as a rectifier and as a control tube, thereby supplying a positive voltage to the grid of the first amplifier tube which varies with intensity of the light falling on the phototube. A rectifier tube 42 of the double diode type in which the two diodes are parallel is used to supply a biasing voltage across the voltage dividing net work consisting of two resistances 43 and 44, which in turn are shunted by a condenser 45, thereby supplying a rectified potential to the cathode of the first amplifier tube. The plate voltage of the first amplifier tube is supplied in part through a potentiometer 46 and condenser 47 and in part through a resistance 48 which shunts the condenser 47. The control grid of the second amplifier tube 49 is tied to this junction point which in turn is connected to the plate of the first amplifier tube. Inasmuch as the control grid of the second amplifier tube is connected directly to the plate in the first amplifier tube, a particularly high amplification is obtained. The other side of the potentiometer 46 is connected through a resistance 50 to the other side of the A. C. line, thereby providing a means whereby an adjustment of the potentiometer can be used to control more accurately the effective voltage. The second amplifier tube has a cathode resistance 51 connected to one side of the A. C. line, its second grid connected to the junction point of potentiometer 46 and the resistance 50 and the plate connected through a second potentiometer 52 and a milliammeter 53 to the other side of the A. C. line. The milliammeter may have a switch 54 to shunt it. The potentiometer and ammeter are shunted by a condenser 55. The principal plate current for the tube 49 can then flow through the second potentiometer 52 with part of the A. C. component passing through the condenser 55. In order to reduce the D. C. component to a minimum, so that the milliammeter will show a low reading for a light condtion, a selenium rectifier 56 is connected through a resistance 57, the steady state plate current for the light condition is largely supplied through the resistance 57 and the selenium rectifier 56, thereby permitting a very low reading on the milliammeter. For a dark condition, when a higher current is drawn, the milliammeter will give a higher reading. The center point of the potentiometer 52 which is connected to the control grid of the Thyratrons 33 and 34 through a resistance 58 becomes more sensitive and it is thereby possible to set the relay to operate more reliably and more certainly. A 6V6 tube may be used for the second amplifier and 2D21 tubes used for the Thyratrons. By a suitable choice of resistors, it is possible to get very marked changes in the milliammeter reading with a variation in light intensity; for example, in one particular instance, the potentiometers were set so that a milliammeter reading of 125 mils was obtained with no light being admitted, and samples were run in which 50, 100, 150, 200, 350 and 800 microns of pressure existed in the sealed vials, the glow given off being a light purple at 50 microns, and a darker purple at 300. Readings of 110 milliamps were obtained at 50 microns and readings of approximately 112, 110, 112, 108 and 103, obtained for other pressure points indicated in the particular test. It is possible to adjust the control points so that various readings are obtained because a greater or lesser part of the plate current of the second amplifier is supplied through the selenium rectifier rather than through the milliammeter. The sensitivity and the glow conditions under which vials are discarded may be adjusted by the two potentiometers 46 and 52.

It will be understood that other types of amplifiers may be used. It is possible to use a reverse connection on the solenoid, so that no light at all is the normal condition, and that the vials are ejected by the use of the photocell system, thereby selecting vials only when the entire system is operating, including the glow and the relay ejection system, by which a vial is knocked off. In other words, good vials are selected, rather than the bad ones being ejected and an apparatus failure can only result in the rejection of vials. Either system has certain advantages, but by ejecting only the rejected ones, less wear and tear occurs to the mechanism and a higher rate of production is obtained.

Other modifications will suggest themselves to those skilled in the art.

As my invention, I claim:

1. An apparatus for selecting properly evacuated vials comprising a high voltage, high frequency source of electrical energy, a conveyor for metal seal capped vials to be tested, an electrode positioned adjacent to the metal seals of each of a series of vials as they proceed along the conveyor, means to conduct said energy to said electrode, thereby inducing a glow discharge in those of said vials which are properly evacuated, and phototube means responsive to said glow to separate the vials exhibiting a glow from the non-glowing vials.

2. An apparatus for selecting properly evacuated vials comprising a high voltage, high frequency source of electrical energy, a conveyor for metal seal capped vials to be tested, an electrode positioned adjacent to the metal seals of each of a series of vials as they proceed along the conveyor, means to conduct said energy to said electrode, thereby inducing a glow discharge in those of said vials which are properly evacuated, and phototube means responsive to the glow from said vials, and a source of light normally operating said phototube during the interval between vials which source of light is obstructed by an opaque portion of the vial at the time when the glow discharge occurs, thereby maintaining the phototube activated at all times except when a vial having a defective vacuum is passing adjacent the phototube.

3. An apparatus for selecting properly evacuated vials comprising a plurality of high voltage, high frequency sources of electrical energy, a conveyor for stoppered, metal-sealed, evacuated vials to be tested, a plurality of electrodes each adjacent separate positions of the metal seals of vials along the line of travel of a series of vials as they proceed along the conveyor, means to conduct said energy from each of said sources to a corresponding one of said electrodes, said electrodes being spaced and adapted to conduct energy sequentially through each vial of a series of vials as they pass along the conveyor, thereby inducing a glow discharge in those of said vials which are properly evacuated, including those which are obdurate to the initial test discharge, and phototube means responsive to the glow induced by the last of said energy sources to separate the vials exhibiting a glow from the non-glowing vials.

4. An apparatus for selecting properly evacuated, stoppered, metal sealed, evacuated vials comprising: a plurality of high-voltage, high frequency sources of electrical energy; a conveyor for stoppered, metal sealed, evacuated vials to be tested; a plurality of separate sequential electrode positions adjacent to the path of the metal seals of the vials as they pass along the conveyor; means to conduct electrical energy from said sources to said electrodes; phototube means responsive to the glow induced in said vials by one of said electrodes and associated source; a source of light shining on said phototube means normally operating in the interval between said vials, which light is obstructed by an opaque portion of the stoppered, metal sealed, evacuated vials at the time when the glow discharge occurs, thereby maintaining the phototube activated at all times except when a vial having a defective vacuum is passing adjacent the phototube; and means controlled by said phototube to cause vials having a defective vacuum to follow a separate path from that followed by properly evacuated vials.

5. A method of selecting properly evacuated, stoppered, metal sealed, evacuated vials which comprises: passing a plurality of such vials along a conveyor; passing a beam of light along the path of the vials in such a position that said beam of light shines on a phototube and is interrupted by each vial in turn as it passes; passing sequentially a plurality of high voltage, high frequency discharges through the vials, one of said discharges occurring at the point at which said light beam is interrupted, thereby serially actuating said phototube by said light beam and by the glow caused by said high frequency discharge when the light beam is interrupted causing the glow from properly evacuated vials to maintain continuous uniform activation of said phototube during the passage of properly evacuated vials; and selectively energizing separating means to separate those vials which fail to cause a glow discharge during this portion of their passage.

References Cited in the file of this patent
UNITED STATES PATENTS

| | | |
|---|---|---|
| 1,917,465 | Schweitzer | July 11, 1933 |
| 1,921,863 | Bickley | Aug. 8, 1933 |
| 2,280,948 | Gulliksen | Apr. 28, 1942 |
| 2,315,287 | Holloway | Mar. 30, 1943 |
| 2,407,062 | Darrah | Sept. 3, 1946 |
| 2,524,929 | Razek | Oct. 10, 1950 |
| 2,633,486 | Sweet | Mar. 31, 1953 |
| 2,635,747 | Hughes | Apr. 21, 1953 |

FOREIGN PATENTS

| | | |
|---|---|---|
| 405,243 | Great Britain | Apr. 30, 1932 |
| 562,792 | Great Britain | July 17, 1944 |